Sept. 9, 1969  F. SMIZASKI ET AL  3,465,465
REACTION SINKER
Filed June 27, 1966

INVENTORS:
FRANK SMIZASKI
STAN KIRKOWSKI
BY Michael A. Borsella
ATTORNEY

United States Patent Office 3,465,465
Patented Sept. 9, 1969

3,465,465
REACTION SINKER
Frank Smizaski, 11 Bernice Road, North Arlington, N.J. 07032, and Stan Kirkowski, 285 York St., Jersey City, N.J. 07302
Filed June 27, 1966, Ser. No. 560,403
Int. Cl. A01k 95/00, 97/00, 91/00
U.S. Cl. 43—42.72      4 Claims

ABSTRACT OF THE DISCLOSURE

A sinker for fishing lines comprising a body portion provided with a longitudinal bore and an end wall with an opening therethrough. A rod extends through the opening into the bore and has a head portion on the end thereof outwardly of the body portion to which a fishing line is attached and with a spring surrounding the rod portion within the bore. The head portion normally contacts the end wall and is adapted to be pulled away from the end wall against the biasing force of the spring so that when the head portion is snapped back into contact with the end wall an axial thrust is exerted upon the sinker to jar it free from a snag or wedged position.

---

The present invention relates in general to fishing apparatus, and more particularly to a novel type of sinker adapted to disengage itself from obstructions encountered along the water bottom.

During a continuous day of fishing, it is not uncommon for a fisherman to lose between ten and fifteen sinkers due to their becoming either wedged between rocks, entangled in debris, or otherwise caught or snagged due to other impediments along the water bottom. In surf casting, for example, where the line is cast out into the surf from the beach and then dragged shoreward at a relatively shallow angle the sinker can most likely become wedged between rocks. In fishing off piers and docks every imaginable sort of junk such as old tires, bedsprings, tin cans and the like can snag the sinker, and lake fishing too has its underwater obstacles capable of snagging and causing loss of the sinker.

In the current state of the sport whenever the sinker becomes inextricably wedged or entrapped beneath the surface, there is nothing the fisherman can practically do other than pull the line free of it, and attach a replacement sinker to the line. This is due to the fact that the line itself allows little latitude both as to the type of force that can be exerted through it and as to the direction in which the force can be exerted.

A line by it nature, will allow only a tension force or pull to be exerted upon the wedged sinker in the direction of the puller, or fisherman. The fisherman may move about to vary the direction of pull slightly but always in the same plane (e.g. along the shore). He cannot, for example, exert a compression force through the line onto the sinker to urge it back along the path through which it became wedged, such as he would be able to do if the line were capable of withstanding axial compression in the manner of a rigid rod.

Briefly stated, the within-disclosed invention provides means for bringing an axial thrust to bear upon the sinker so as to urge it in the opposite direction of the pull in the line. In this manner the sinker will most likely be jarred free from a snag or from a wedged position, and thence will not be lost to the fisherman.

The above-mentioned thrust or axial force exerted upon the sinker may in certain circumstances also operate to free a hook. The hooks on a fishing line readily catch small ledges or crevices in rocks, but in compensation do not imbed themselves too deeply therein. In such a situation if the sinker and a hook are simultaneously snagged, the axial thrust which frees the sinker may also jar the hook loose.

Therefore one object of this invention is to provide a novel sinker for use in fishing, embodying means for freeing itself from a wedged or otherwise snagged position.

Another object of the invention is to provide a sinker of the above-indicated nature embodying means for bringing an axial force to bear upon the sinker in a direction opposite from the pull in the line exerted by the fisherman.

Another object of the invention is to provide a novel sinker of the above nature which will be relatively easy and economical to manufacture, and yet positive and reliable in use.

Further objects and advantages will appear more fully hereinafter from a consideration of the detailed description which follows taken together with the accompanying drawing wherein one embodiment of the invention is illustrated by way of example. It is to be expressly understood however, that the drawing is for the purposes of illustration only and is not to be construed as defining the limits of the invention, reference being had for this purpose to the appended claims.

In the drawing wherein like reference characters indicate like parts:

Figure 1:
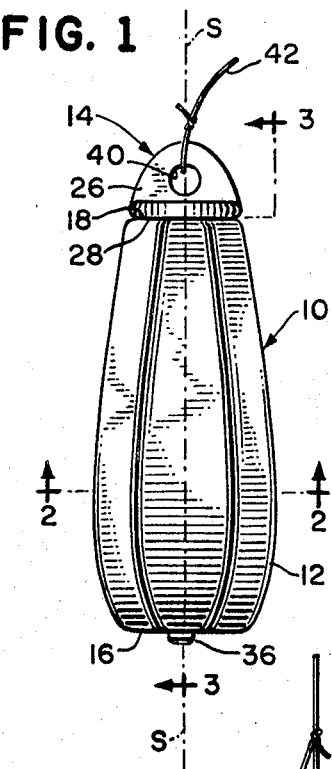
FIG. 1 is an elevation view of an assembly of the novel sinker of this invention.
Figure 4:
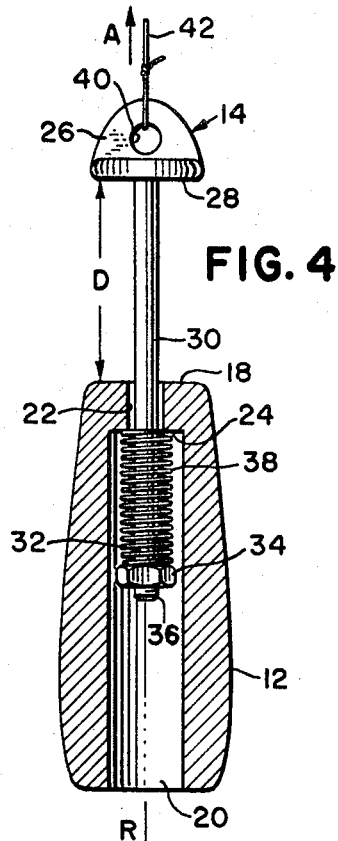
FIG. 4 is a section view of the sinker of this invention, but showing the relationship between the head and body portions of the sinker when the interior spring is fully compressed.

Referring now to the drawing and more particularly to FIGURE 1, there is shown a fishing sinker assembly generally designated by the numeral 10 comprising a relatively elongated body portion 12 and the bell-like head portion 14. It is recognized that while sinkers may be manufactured in a variety of contours and forms, for the purposes of this illustration of the invention, the body portion 12 is substantially a pear-shaped hexahedron (FIG. 2) having a relatively broad bottom base 16 tapering to a flat top surface 18 (FIG. 4).

Axially within the body portion 12 and substantially about the axis of symmetry S—S thereof, an interior tunnel or bore 20 is disposed extending towards the surface 18. A second bore 22 colinear and concentric with the bore 20 but of relatively smaller diameter extends downwards from the surface 18 to meet the bore 20 and thereby form a circular shoulder or step 24 at the meeting plane P—P of the two bores 20 and 22.

The head portion 14 of the sinker assembly 10 (FIGS. 3 and 4) comprises a substantially bell-formed top portion 26 (in the illustration of this invention) having a flat base 28 of the same configuration and size as the surface 18 on the body portion 12. Extending rectilinearly from the center thereof is a shaft 30 of slightly greater length than elongated body portion 12, having threaded portion 32 adequate to secure a standard nut 34 on the bottom 36 thereof.

Figure 3:
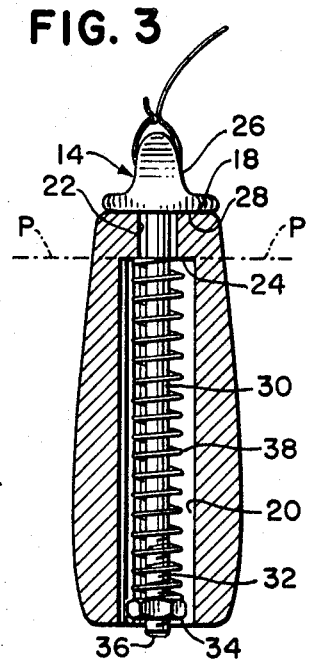
FIG. 3 is a section view taken along the line 3—3 of FIGURE 1, looking in the direction of the arrows.

Thus it is possible to assemble the sinker assembly 10 by inserting the shaft 30 linearly into the colinear bores 20 and 22 so that when the threaded portion 32 extends through the bore 16 a sufficient distance to attach the nut 34 thereon, the flat base 28 will be in contact with, and rest upon the flat top surface 18 (FIGS. 1 and 3).

Figure 2:
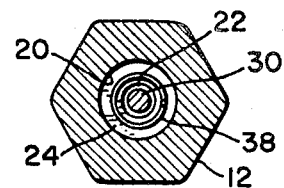
FIG. 2 is a section view taken along the line 2—2 of FIGURE 1 looking in the direction of the arrows.

The sinker assembly 10, further embodies a relatively strong coil spring 38 disposed between and anchored against the shoulder 24 and the nut 34, and of sufficient diameter to allow the shaft 30 to pass axially therethrough (FIG. 2). The nut 34 is of such size that it may readily enter the bore or tunnel 20 and be drawn upwards therein.

Figure 5:
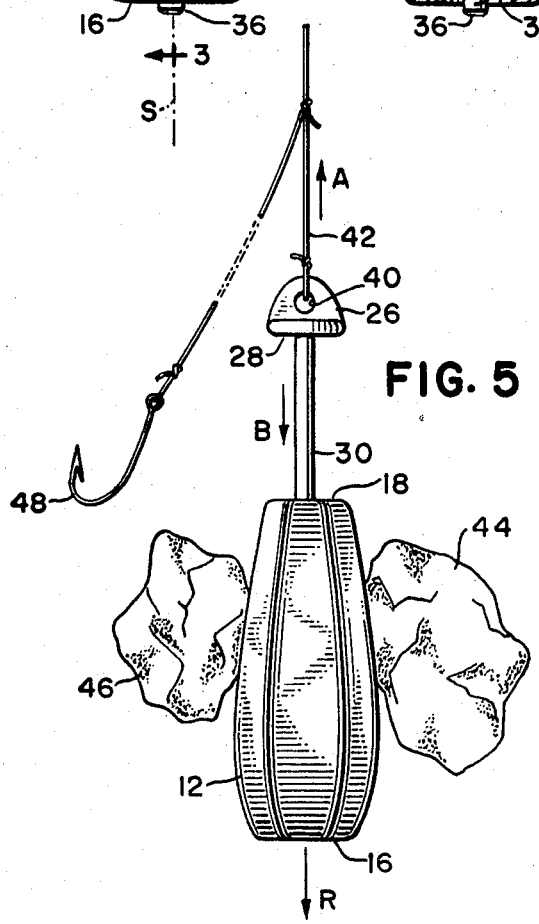
FIG. 5 is an example illustrating a manner in which the sinker of FIGURE 1 may become wedged between two rocks.

The bell-shaped top porition 26 of the head 14 further contains a through hole 40 (FIGS. 1 and 2) for the purpose of attaching the sinker assembly 10 to a fishing line 42 (FIGS. 4 and 5).

It will now be evident to those skilled in the art, that when the line 42 is pulled along the direction of the arrow A, (FIGURES 4 and 5) if the body portion 12 of the sinker is either snagged, wedged or otherwise caught and restrained, the head portion 14 may be pulled along the direction A thus compressing the coil spring 38 between the shoulder 24 and the nut 34. The head portion 14 may thus be pulled a distance D and extended outwards from the body portion 12 (FIG. 4) before the spring 38 bottoms, and is completely compressed. The distance D may be as much as one inch or more depending upon the particular size and construction of the assembly 10. It will further be evident that when the head portion is thus extended by a pulling force on the line 42, a sudden releasing of the force will cause the head to be snapped back along the direction B into normal position violently by the resilient force in the spring 38 so that the flat base 28 will strike sharply against the flat top surface 18, to cause a reaction force R against the body portion 12, to be exerted axially in a direction opposite from the pull A in the line exerted by the fisherman.

Thus in a situation illustrated in FIG. 5 wherein the sinker is wedged between rocks 44 and 46, the reaction force R will be exerted against the top surface 18 in a direction tending to push the sinker back along the path which it became entrapped, thereby freeing the sinker.

An auxiliarly benefit is derived from the sinker of this invention that in some situations the hook 48 may become snagged or caught along with the sinker. The reactive force R tending to free the sinker will most likely operate to free the hook 48 as well.

While the only one embodiment of the invention has been illustrated and described, it will be obvious to those skilled in the art that modifications may be made and changes in the relative arrangement of the part without departing from the spirit and the scope of the invention.

What is claimed is:

1. A sinker for a fishing line adapted to disengage itself from obstructions along the water bottom comprising, a body portion having an axial bore extending therethrough, said body portion embodying a flat top surface, a narrower opening at the top of said bore, a rod extending through the narrower opening and into the bore, a head portion on the end of said rod outwardly of said body portion, said head portion embodying a matching flat base ordinarily in contact with said flat top surface and having a flat surface area corresponding substantially to that of said flat top surface, an aperture in said head portion having a fishing line attached therethrough, said head portion being adapted to be pulled away from the body portion and said flat base embodying stop means on the end of said rod, resilient means about said rod in said bore biased against the body portion for returning the stop means of said head portion into contact with the body portion.

2. The sinker claimed in claim 1 wherein said resilient means comprises a spring under compression and becomes operable when the head portion is pulled away from the body portion by a pulling force in said line.

3. The sinker claimed in claim 1 wherein said resilient means comprises a spring anchored against the body portion at one end and against stopping means on the rod at the opposite end.

4. The sinker claimed in claim 1 wherein said resilient means comprises a coil spring so that an axial thrust is exerted upon the body portion in a direction opposite to the pull in the line when the head portion is returned into contact with the body portion.

References Cited

UNITED STATES PATENTS

| | | | |
|---|---|---|---|
| 2,079,335 | 5/1937 | Pflueger | 43—42.02 X |
| 2,739,407 | 3/1956 | Godsey | 43—42.72 X |
| 84,885 | 12/1868 | Leach et al. | 43—15 |

SAMUEL KOREN, Primary Examiner

D. J. LEACH, Assistant Examiner

U.S. Cl. X.R.
43—17.2, 42.02